(No Model.) 2 Sheets—Sheet 1.
J. PARKER & T. NICHOLS.
Machine for Curling the Brims of Hats.
No. 233,543. Patented Oct. 19, 1880.
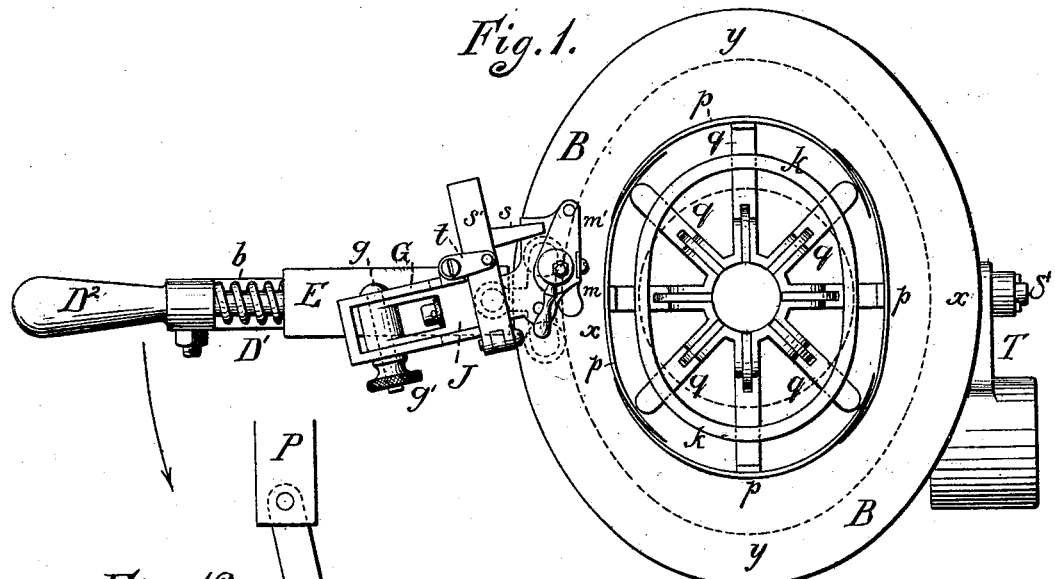
Fig. 1.
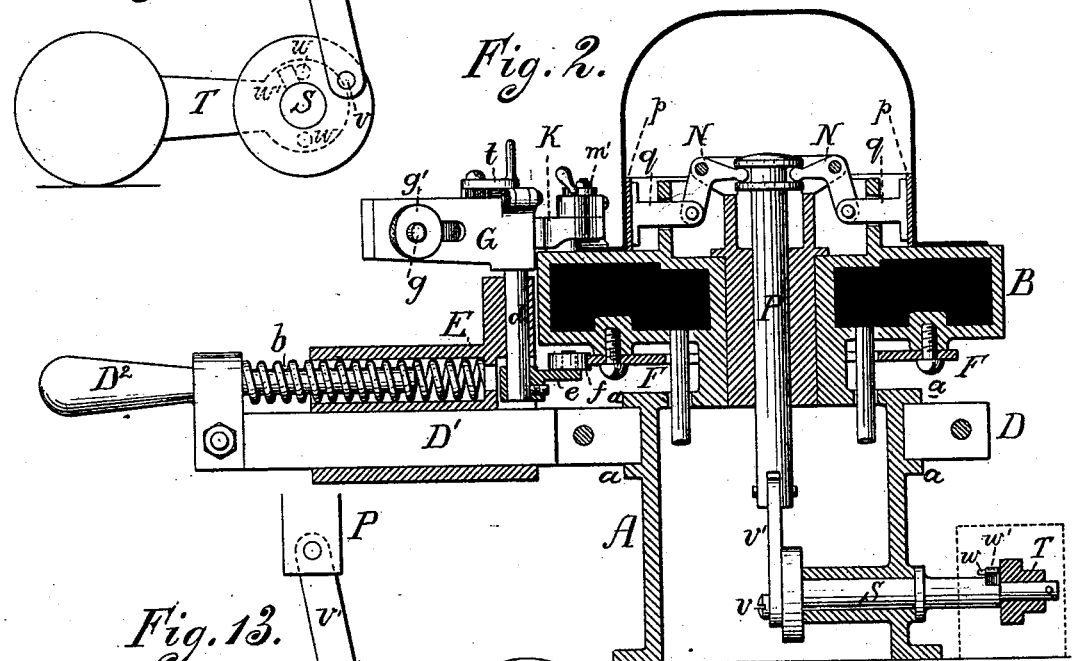
Fig. 12. Fig. 2. Fig. 13.
Witnesses:
Harry Smith
Robert H. Hoz.
Inventors:
John Parker
and
Thomas Nichols
by their Attorneys
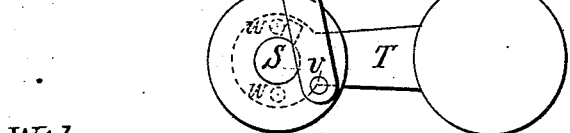

(No Model.) 2 Sheets—Sheet 2.
J. PARKER & T. NICHOLS.
Machine for Curling the Brims of Hats.
No. 233,543. Patented Oct. 19, 1880.
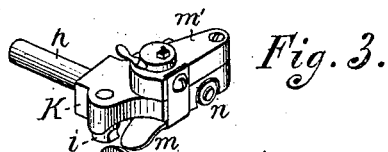
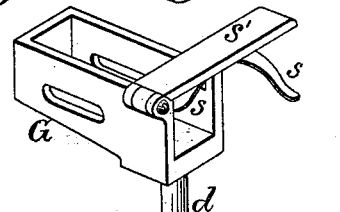
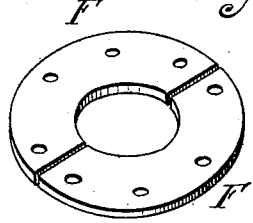
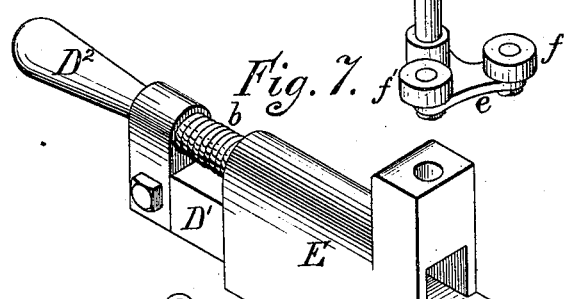
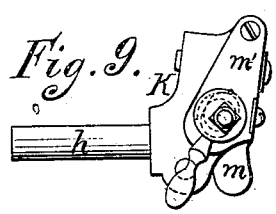
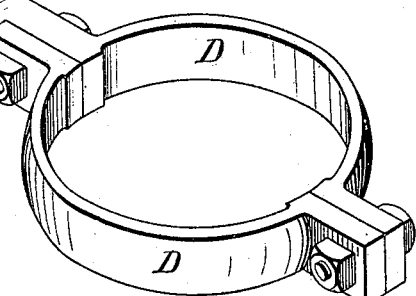
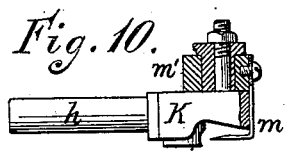
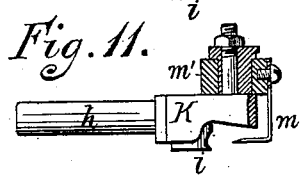
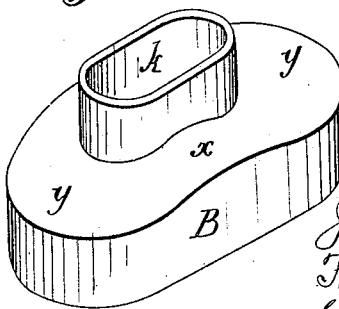
Witnesses:
Harry Smith
Robert H. Hoz.
Inventors:
John Parker
and
Thomas Nichols
by their Attorneys
Howson and Son
N. PETERS, PHOTO-LITHOGRAPHER, WASHINGTON, D C.

UNITED STATES PATENT OFFICE.

JOHN PARKER, OF NEW YORK, N. Y., AND THOMAS NICHOLS, OF NEWARK, NEW JERSEY.

MACHINE FOR CURLING THE BRIMS OF HATS.

SPECIFICATION forming part of Letters Patent No. 233,543, dated October 19, 1880.

Application filed July 15, 1880. (No model.)

*To all whom it may concern:*

Be it known that we, JOHN PARKER, a subject of the Queen of Great Britain and Ireland, residing in the city, county, and State of New York, United States of America, and THOMAS NICHOLS, a citizen of the United States, residing in Newark, New Jersey, have invented a Machine for Curling the Brims of Hats, of which the following is a specification.

The object of our invention is to construct a machine whereby the brims of hats may be curled without the employment of the skilled labor demanded in performing this operation according to the method now in use. This object we attain in the manner hereinafter set forth, reference being had to the accompanying drawings, in which—

Figure 1, Sheet 1, is a plan view of our machine for curling hat-brims; Fig. 2, a vertical section of the same; Figs. 3, 4, 5, 6, 7, and 8, Sheet 2, perspective views of different parts of the machine detached from each other; and Figs. 9, 10, and 11, Sheet 2, and Figs. 12 and 13, Sheet 1, detached views, illustrating features of the invention.

A is a hollow standard or column adapted to be bolted to a work-bench or other suitable support, and having at the top a hollow work table or bed, B, Figs. 1 and 2, which is furnished with suitable inlet and outlet pipes, whereby steam may be caused to circulate through the bed, so as to maintain the same constantly in a heated condition.

A two-part ring, D, Fig. 7, embraces the upper portion of the standard A, and is free to rotate thereon, said ring being maintained in its proper vertical position on the standard by flanges $a$ $a$, between which the ring fits snugly. One part of the ring has a projecting arm, D', the outer end of which is furnished with a suitable handle, D², and to this arm is adapted a frame, E, which is at liberty to slide on the arm in a radial direction, and is acted upon by a spring, $b$, the tendency of which is to force the frame E inward or toward the work-bed B.

The inner end of the frame E has a bearing for a vertical spindle, $d$, to the lower end of which is secured a forked plate, $e$, one arm of the latter carrying an anti-friction roller, $f$, and the other arm a similar anti-friction roller, $f'$. These rollers, owing to the action of the spring $b$ on the frame E, are maintained in contact with the outer edge of a guide or pattern plate, F, secured by bolts to the under side of the work-bed B, as shown in Fig. 2, the said guide or pattern plate being made in two or more sections, as shown in Fig. 6, so that it may be readily applied to or removed from the work-bed without necessitating the removal of the latter from the standard A.

The upper end of the spindle $d$ carries a box, G, and to radial slots in the opposite sides of the latter is adapted a pin, $g$, one end of which has an enlarged head formed upon it, while the other end is threaded and provided with a thumb-nut, $g'$, by manipulating which the pin may be secured to the box G in any position to which it may have been adjusted in respect thereto, or may be released when a new adjustment becomes necessary.

To the pin $g$ is hung an arm, J, and to the end of the latter is pivoted, by means of its stem $h$, the brim-curling device, which may resemble any of those at present in use in connection with hand-tools. The device which we prefer to use, however, and which is shown in the drawings, comprises four essential parts—namely, the body K, the spring-block $i$, which forms an abutment for the curled edge of the brim, the plate $m$, over which the brim is bent, and the roller $n$, which presses the brim after it has been bent over the plate $m$.

Instead of these parts being fixed in their relation to each other, however, as usual, we secure the plate $m$ to an arm, $m'$, pivoted to the body K of the device, this arm having a slot for the reception of an eccentric-sleeve hung to a pin on the body K, Fig. 9, and having a head furnished with a handle, by which it may be readily manipulated, so as to throw the arm $m'$ and its plate $m$ into or out of operative position, as shown in Figs. 10 and 11, a suitable stop-pin acting in conjunction with a slot in the head of the eccentric to limit the movement of the latter.

The upper surface of the work-bed B is shaped to conform to the shape of the hat—that is to say, it is highest at the points $x$ $x$ on each side and is gradually depressed toward each end, the points $y\ y$ being the lowest. (See Fig. 8.)

In order that the brim-curling device may press the hat-brim firmly upon the bed, the outer end of the arm J and the rear end of the body K of the brim-curler are acted upon by springs $s\ s$, carried by a bar, $s'$, hung to the box G, so as to be capable of being thrown up when it is desired to release the arm J, a turn-buckle, $t$, serving to retain the bar in its depressed position when the machine is in use.

The hat is held in its proper position on the bed B by means of a series of spring-plates, $p$, which are curved to conform to the shape of the interior of the hat, and are acted upon by the outer ends of arms $q$, guided in a flange, $k$, on the bed B, the plates being preferably secured to certain of the arms in order to maintain them in their proper positions in respect to each other without interfering with the movements of expansion and contraction, the latter movements being effected by means of a vertical rod, P, a grooved collar at the upper end of which acts on the short arms of a series of bell-crank levers, N, hung to projections on a tubular sleeve in the standard A, the long arms of these levers being connected to the inner ends of the arms $q$. (See Fig. 2.) The elevation and depression of the rod P is effected by means of a crank-pin, $v$, on a shaft, S, said pin being connected to the rod P by a link, $v'$, and the shaft S being adapted to a bearing in the standard A.

To the outer end of the shaft S is loosely hung a weighted arm, T, pins $w\ w$ on which act upon a radial projection or lug, $w'$, on the shaft S, the relation of the lugs to the pins being such that as the weighted arm T is thrown over to one side of the shaft S said shaft and the rod P will be operated so as to effect the expansion of the plates $p$; but when the arm is thrown over to the other side of said shaft S the retraction of the plates $p$ will be effected. This will be understood on reference to Figs. 12 and 13. The weight on the arm T should be simply sufficient to hold the hat in place on the bed B without risk of bursting or stretching the said hat. There is a certain amount of lost motion of the arm T in each direction before one of the pins $w$ strikes the lug $w'$, so that a single impulse only need be imparted to the arm, the momentum acquired by the latter before the lug $w'$ is struck by one of the pins $w$ being sufficient to complete the movement.

The operation of the machine is as follows: The arm J being thrown back so as to carry the brim-curling device out of the way, the hat is applied to the spring-plates $p$ when the latter are in the retracted position. The arm T is then operated so as to expand the plates which clamp the inside of the hat and firmly retain the said hat in its proper position on the bed B. (See Fig. 2.) The arm J is then depressed, and the bar $s'$ adjusted so that its springs $s$ bear on the bar J and upon the body K of the brim-curler, the bar being retained by the turn-buckle $t$. The plate $m$ is then thrown outward, as shown in Fig. 11, and the edge of the hat-brim introduced between said plate and the block $i$, the plate being then moved inward, as shown in Fig. 10, so as to bend the brim. (See Fig. 2.)

It should be understood that the arm J has been previously so adjusted in respect to the box G that the brim-curling device occupies such a position in respect to the crown of the hat as the desired width of the brim may suggest, the object of making the arm J laterally adjustable in the box G being to provide for the lateral adjustment of the brim-curler in respect to the crown-clamping devices, as demanded by the varying widths of the hat-brims. The device being adjusted, as shown in Figs. 1 and 2, the handle $D^2$ is grasped by the operator and moved in the direction of the arrow, thereby causing a corresponding movement of the frame E and the parts carried thereby, the rollers $f\ f'$ of the plate $e$ traversing the face of the guide-plate F, which is shaped to accord with the desired shape of the hat-brim, so that as the frame E is moved around the bed B the proper radial movements are imparted thereto and to the brim-curler. As the sides of the hat-brim merge into the front and back ends of the same the curve of the edge gradually becomes sharper, and the curling devices must accommodate themselves to this change of curve. This is effected in our machine by means of the spindle $d$, which is free to rock as the plate $e$ is vibrated by the action of the guide-plate F on the two rollers $f\ f'$, this movement being transmitted to the box G and to the arm J and the brim-curling devices carried thereby, thus effecting the desired automatic adjustment of the brim-curler at the proper times, in accordance with the character of the guide-plate F.

The action of the springs $s\ s$ upon the brim-curling device serves to press the hat-brim firmly upon the bed B, the said curling device swinging upon its stem $h$, so as to accommodate itself to the curved upper surface of the bed.

When the curling of the brim is completed, or it is desired to examine the said brim, the plate $m$ is thrown outward by operating the eccentric-sleeve so as to free the plate from the curled portion of the brim and permit the elevation of the brim-curler and the turning back of the arm J. On operating the weighted arm T so as to retract the plates $p$ the hat can be removed and a new hat applied preparatory to a repetition of the operation.

The ring D, with its arm D', the frame E, and the box G, constitute, in effect, a carrier, whereby the brim-curling device is caused to travel around the hat-brim, the connection of the curling device with the carrier being such as to permit said device to be readily thrown in and out of work and to accommodate itself to the shape of the work table or bed and of the hat-brim.

It will be seen that in the above-described machine the pressing and curling of the brim and the necessary changes in the position of the brim-curling device are all effected automatically, the only operations to be performed by the attendant being simple ones, which do not require the exercise of skill or strength, so that the operation of curling the brim, in place of being one of the most laborious and expensive of any connected with the manufacture of the hat, is reduced to one of the simplest and least expensive.

In carrying out our invention various changes in the detailed construction of the machine may be made without changing its essential character. For instance, different kinds of hat-clamping devices may be used and different means adopted for heating the bed B, and in some cases a grooved plate may be substituted for the plain plate F. The construction and arrangement shown and described, however, are simple and efficient, and are preferred.

We claim as our invention—

1. The combination of a work table or bed adapted to be heated with hat-retaining devices centrally arranged thereon and adapted to be expanded and contracted radially, so as to clamp the inside of a hat, as set forth.

2. The combination of devices for clamping and retaining the hat with a hollow imperforate bed, B, adapted to be heated by steam, and having an upper surface on which the brim of the hat rests, as set forth.

3. The combination of a fixed work table or bed, means for holding a hat thereon, a brim-curling device, a carrier for said device, and means for moving said carrier around said work table or bed, all substantially as described.

4. The combination of the work table or bed and its standard with a guide-plate, F, made in sections, whereby its application to the bed is facilitated, as set forth.

5. The combination of the work table or bed, means for holding a hat thereon, a guide-plate, a brim-curling device, and a carrier therefor made in two parts, one of which is pivoted to the other, as described, whereby the brim-curler is at liberty to accommodate itself to the varying curve of the hat-brim, as described.

6. The combination of the work table or bed, means for holding a hat thereon, a guide-plate, a brim-curling device, a carrier therefor comprising the radially-sliding portion E and swinging portion G, and means, substantially as described, whereby the guide-plate is caused to effect both the radial movement of the portion E and the swinging movement of the portion G, as set forth.

7. The combination of the work table or bed, means for holding a hat thereon, a carrier capable of moving around the said table or bed, and a brim-curling device having an arm pivoted to said carrier, whereby the entire brim-curler may be turned up and away from the table or bed, as set forth.

8. The combination of the work table or bed, means for holding a hat thereon, a carrier capable of moving around said work table or bed, and a brim-curling device having a stem, $h$, whereby it is free to vibrate independently of the carrier, as set forth.

9. The combination of the work table or bed having its upper surface curved to conform to the shape of the hat with a carrier adapted to be moved around said work-table, and a brim-curling device pivoted as described, whereby it is free to conform to the shape of said upper surface of the table, as specified.

10. A brim-curling device having an abutment, $i$, a plate, $m$, and means whereby said plate may be readily adjusted laterally from and toward the abutment $i$, as set forth.

11. A brim-curling device in which are combined a body, K, an abutment, $i$, a plate, $m$, a pivoted block, $m'$, carrying the same, and means, substantially as described, for effecting the lateral adjustment of said block.

12. The within-described carrier for the brim-curling device, said carrier comprising the two-part ring D, the arm D′, the frame E, and the box G, as specified.

13. The combination of the standard A and work table or bed B, the guide-plate F, the ring D, having an arm, D′, the frame E, forming part of the carrier and capable of sliding on the arm D′, and a spring, $b$, for acting on said frame, as set forth.

14. The combination of the work table or bed B, the guide-plate F, the frame E, the box G, carrying the brim-curler, the spindle $d$, adapted to the frame E, and the plate $e$, secured to said spindle and having rollers $f f'$, as set forth.

15. The combination of the work table or bed B, means for clamping a hat thereto, a box, G, forming part of a carrier, as described, and having slotted sides, an arm, J, carrying the brim-curling device, a pin, $g$, adapted to the slots of the box G and serving as a pivot for the arm J, and means for securing said pin to and releasing it from the box, as set forth.

16. The combination of the work table or bed B, means for securing a hat thereto, the slotted box G, forming part of the carrier, the adjustable pin $g$, the arm J, hung thereto, and the brim-curling device having a stem, $h$, whereby it is pivoted to the arm J, as specified.

17. The combination of the work table or bed B and means for holding a hat thereon, a brim-curling device, a carrier adapted to be moved around the table B, and to which said brim-curler is hung so as to be free to rise, a bar, $s'$, adapted to said carrier and having a spring or springs, $s$, for maintaining the brim-curler in contact with the table B, and means for retaining and releasing said bar, as set forth.

18. The combination of the standard A and table B, the hat-clamping plates $p$, the arms $q$, levers N, rod P, shaft S, having crank-pin $r$, link $v'$, and means for vibrating said shaft S, as set forth.

19. The combination of the hat-clamping devices and the rod P, for actuating the same, with the shaft S, having a crank-pin connected to said rod, and the weighted arm T, having pins $w$, for acting on a lug, $w'$, of the shaft, as set forth.

In testimony whereof we have signed our names to this specification in the presence of two subscribing witnesses.

JOHN PARKER.
THOMAS NICHOLS.

Witnesses:
 HULBERT PECK,
 EDW'D H. PECK.